United States Patent Office 3,674,640
Patented July 4, 1972

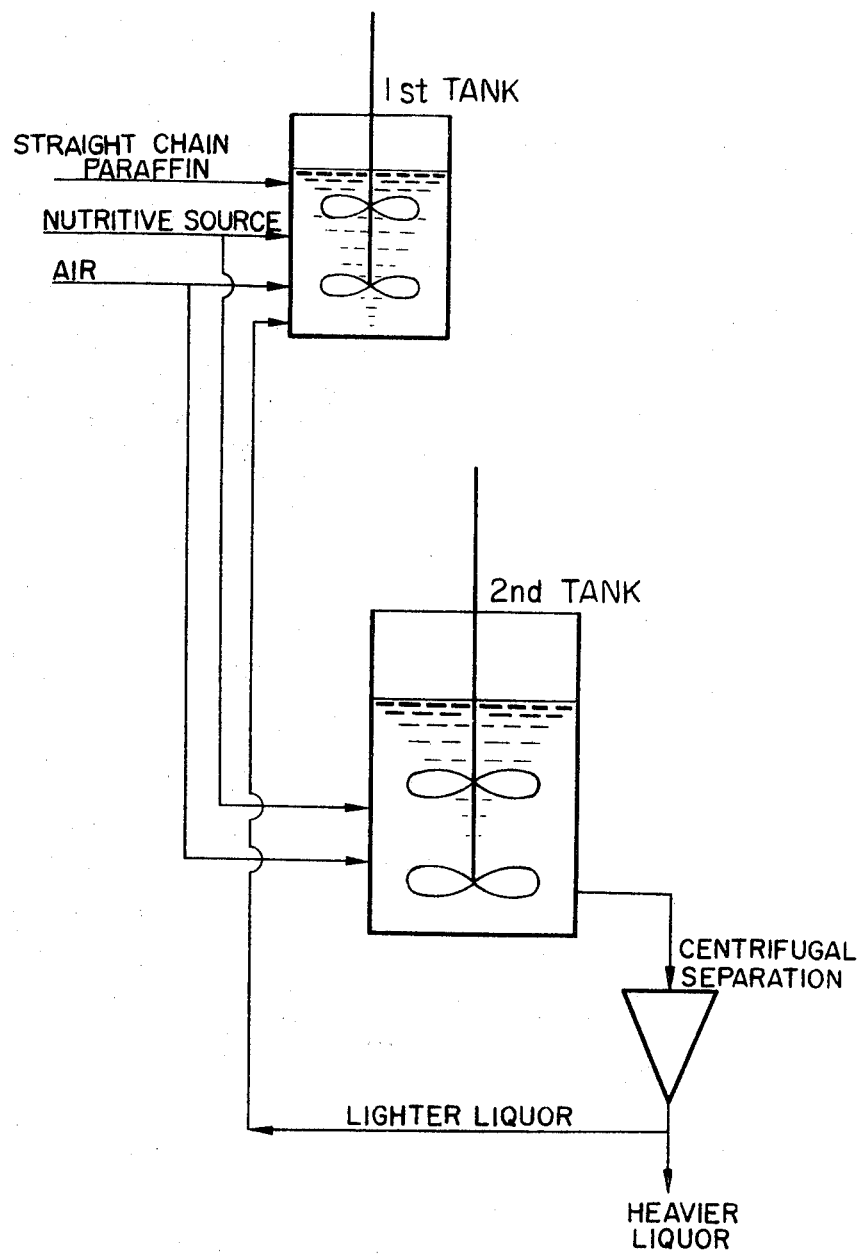

3,674,640
CULTIVATION OF HYDROCARBON-CONSUMING YEASTS
Isao Takeda, Ohi-machi, Iruma-gun, Takashi Iguchi, Tokyo, Katsuaki Tsuzuki, Nobeoka-shi, and Tooru Nakano, Tokyo, Japan, assignors to Asahi Kasei Kogyo Kabushiki Kaisha, Osaka, Japan
Filed Jan. 14, 1970, Ser. No. 2,820
Claims priority, application Japan, Jan. 30, 1969, 44/6,293; Feb. 26, 1969, 44/13,946
Int. Cl. A23l 1/28
U.S. Cl. 195—28 R 4 Claims

ABSTRACT OF THE DISCLOSURE

Method for the cultivation of hydrocarbon-consuming yeasts by a continuous fermentation process which comprises (a) cultivating *Torulopsis petrophilum*, *Candida petrophilium* or *Brettanomyces petrophilum*, a species of yeast capable of consuming hydrocarbons as the carbon source in a medium containing a hydrocarbon fraction boiling at temperatures in a range of 200 to 360° C.; (b) aerobically conducting said cultivation in an apparatus consisting of (1) an emulsification tank mainly for forming emulsion of said hydrocarbon and an aqueous solution and (2) a main fermentation tank for effecting cell formation or fermentative production of useful substances, said tanks being connected in series; (c) using as the medium in said emulsification tank a medium containing said hydrocarbon at a high concentration, the fermentation waste liquor from the main fermentation tank and an alcohol at a concentration of 0.5 percent by volume or lower based on the entire volume of said medium; and (d) feeding into said main fermentation tank the emulsified fermentation liquor obtained in said emulsification tank.

BACKGROUND OF THE INVENTION (1) Field of the invention

This invention relates to a method of cultivating hydrocarbon-consuming yeasts. More particularly, it is concerned with a process for efficiently producing yeast or fermentation products from hydrocarbons by carrying out a two-tank continuous cultivation of a species exerting excellent properties for the cultivation of yeast capable of consuming hydrocarbons as the carbon source, in which the emulsified hydrocarbon is subjected to fermentation in a main fermentation tank (the second tank), said hydrocarbon being obtained in the form of emulsion in an emulsification tank (the first tank) in which is fed the hydrocarbon at a high concentration, the fermentation waste liquor and an alcohol. Further more particularly, the present invention is concerned with a method of cultivating yeasts comprising, in cultivating a species of the genus Torulopsis, *Torulopsis petrophilum*, a species of the genus Candida, *Candida petrophilum*, or a species of the genus Brettanomyces, *Brettanomyces petrophilum* in a medium consisting of a hydrocarbon fraction boiling at temperatures in a range from 200 to 360° C. and an aqueous solution containing inorganic salts, an inorganic nitrogen and organic nitrogen source usually employed for the cultivation of microorganisms, producing an emulsion of said medium with a portion of the fermentation waste liquor previously used and a small amount of an alcohol such as methyl, ethyl or propyl alcohol added thereto in an emulsification tank, effecting fermentation in a main tank by the use of the emulsified hydrocarbon and isolating the cells and other fermentation products.

It is an object of this invention to provide a novel method of fermentation in which yeast cells are obtained in a high yield in terms of the hydrocarbon raw material. Another object is to provide a novel method of cultivating yeasts in a shorter period of cultivation time resulted from a shorter period of emulsifying time. A further object is the provision of a novel method of hydrocarbon-consuming yeasts being advantageous from an industrial point of view. Other objects and advantages of this invention will be apparent from the descriptions as set forth hereinbelow.

(2) Description of the prior art

It has been known heretofore that a number of microorganisms are able to consume hydrocarbons as the only source of carbon, which microorganisms include a wide variety of bacteria, actinomycetes, yeasts and fungi. However, there have been found a very limited range of species to consume the hydrocarbon at a high efficiency, with much difficulty encountered in satisfactorily utilizing the cells, namely, manufacture on an industrial level of useful natural products such as protein, nucleic acid and lipid from the petroleum source.

SUMMARY OF THE INVENTION

We have made extensive investigations of the source of the isolation of microorganisms from the nature with the result that a number of fresh yeasts useful for the object have been isolated which belong to the genera Torulopsis, Candida and Brettanomyces.

The present invention is based upon the discovery that the yeast can be formed with stability and efficiency by continuously feeding a medium consisting of hydrocarbon, inorganic nitrogen, inorganic salts and organic source of nitrogen to which the fermentation waste liquor previously used and a small amount of an alcohol are added into an emulsification tank, mainly effecting formation of the hydrocarbon emulsion in the first tank, i.e., the emulsification tank and conducting the mycelial formation in the second tank, i.e., the main fermentation tank with the emulsified fermentation liquor passed thereto from the first tank. By the use of continuous fermentation carried out in such a manner, fermentation products other than the mycelia, such as amino acids, organic acids and vitamins, can be formed by the above-mentioned species with a high efficiency.

Fermentation conditions employed in the first and second tanks may be variable depending upon the species cultivated and the products desired. Cultivation temperature is, for example, from 25 to 37° C. and it is necessary to carry out the fermentation under aerobic conditions while controlling pH of the medium. Cultivation conditions such as temperature and pH may be those used in the prior processes and are not specifically limited.

As the alcohol used in the method of this invention may be used any lower alcohols such as methanol and ethanol as well as any higher alcohols such as lauryl and cetyl alcohols. The amount of alcohol to be added may be varied and preferably is in a range from 0.03 to 0.5% by volume of the entire medium.

Separation of the cells from the fermentation liquor produced may be carried out in accordance with the procedures used in the prior processes and involves, for example, separation of the fermentation liquor into heavier and lighter liquors by means of a Westfalia separator, adjustment of pH of the former to approximately 5, addition of a nonionic surface active agent, e.g., polyoxyethylenesorbitan monolaurate in an amount as much as 0.005 ml. per 100 ml. of the former, heating the mixture to 50° C. followed by agitation, separation of the cells therefrom by means of a nozzle type Westfalia separator, washing the cells with water and drying the same in a drum dryer. Separation of the fermentation products may be conducted, for example, by subjecting the fermentation broth from which the cells have been removed to concentration treatment or treatment with an ion exchange resin for the fractional isolation.

The first characteristic feature of this invention, namely, continuous cultivation process, will be described below with reference to the accompanying drawing, which shows an example of an apparatus used in the process of the present invention. As shown in the figure, in the two-tank continuous fermentation system, a medium consisting of the hydrocarbon at a high concentration, preferably from 5 to 40% by volume, inorganic salts, nitrogen source and organic nutritive source is placed in the first tank, in which a small amount of the alcohol is added and then cultivation and emulsification of the hydrocarbon are effected and the emulsion from the first tank is fed, either continuously or intermittently into the second tank, in which cultivation is conducted while feeding an aqueous medium consisting of inorganic salts, nitrogen source and organic nutritive source containing no hydrocarbon. It is necessary to carry out the cultivation under the aerobic conditions in both of the first and second tanks. In the second tank is efficiently effected the main fermentation, that is, production of the cells or formation of the fermentation products.

There is no particular limitation regarding the nature of inorganic salts, nitrogen source and organic nutritive source used in the first and second tanks, which may be selected from those employed heretofore. For example, as the inorganic salt are mentioned dihydrogen potassium phosphate, monohydrogen potassium phosphate, magnesium sulfate, sodium chloride, ferrous sulfate, manganese sulfate, zinc sulfate, calcium chloride and the like. As the organic nutritive source may be employed peptone, N-Z amine, meat extract, yeast extract, corn steep liquor, casein hydrolyzate, fish meal, hydrolyzate thereof and the like. Nitrogen-containing materials such as ammonia, inorganic and organic ammonium salts, for example, ammonium chloride, sulfate, nitrate, carbonate, phosphate and acetate and urea may be utilized as the nitrogen source.

Secondly, this invention is characterized by addition to the medium in the first tank of the fermentation waste liquor previously used, preferably at a ratio from 5 to 75% by volume based on the entire medium, and further, of a small amount of an alcohol such as methanol or ethanol. As the fermentation waste liquor may be used the lighter liquor from centrifugal separation as shown in the figure, and sometimes, the fermentation waste liquor prior to the centrifugal separation or its hydrolyzate.

The third characteristic feature of the present invention lies in the use of three species as specified above which are of excellent hydrocarbon-consuming capacity and have excellent properties for the use of feed or food.

Combination of the above-described features produces much better results by the method of the present invention than by the prior methods, as understood from the descriptions below. First, continuous fermentation by the use of two-tank fermentation system enables feeding of hydrocarbon at a high concentration, thereby needing a smaller fermentation tank in which emulsion formation of the hydrocarbon requires a much shorter period of time as compared with the low-concentration feeding. As noted, the present invention has a feature in the provision of an emulsified tank in addition to a main fermentation tank unlike prior art processes. Second, efficiency of consuming hydrocarbon is very high in this invention. Generally in the prior art, it is known that the yeast mycelia is formed from hydrocarbons, particularly from straight-chain hydrocarbons at a ratio of 1 to 1 by weight. However, in the process according to this invention the former is obtained at a ratio higher than 1:1 from the latter, and the fermentation products are obtained at a higher efficiency than those in the prior processes. It should be especially noted that there has been no process where the yield of yeast mycelia formation to hydrocarbon added exceeds 100%. The yield higher than 100% can be achieved first by the method according to this invention, and is accomplished by combination of the aforementioned three types of features. Other advantages of this invention will be obviously seen from the following descriptions, experiments and examples.

DESCRIPTION OF PREFERRED EMBODIMENTS

Effects of the addition of the fermentation waste liquor and alcohol in a small amount are described in more details by the experiments given below.

Experiment 1

Experiment was made using *Candida petrophilum* ATCC No. 20226.

Composition of the medium in the first tank is as follows:

Straight chain paraffins containing from 14 to 17 carbon atoms (purity, 98% or higher): 15% (by volume/volume)
Manganese sulfate: 0.004% (by weight/volume)
Magnesium sulfate: 0.05% (by weight/volume)
Calcium chloride: 0.01% (by weight/volume)
Urea: 0.3% (by weight/volume)
Ammonium sulfate: 0.2% (by weight/volume)
Ferrous sulfate: 0.005% (by weight/volume)
Corn steep liquor: 0.1% (by weight/volume)

The medium of the above composition, pH 4.5, 4 l., is placed in the first tank, 8 l. in capacity, and maintained at the same concentrations of the nutrient sources. In fact, the consumed amounts of the inorganic salts, nitrogen source and organic nutritive source as determined by the yield of the product are constantly supplemented. In the use of fermentation waste liquor for emulsion formation, the shortage found in consideration of the composition of the waste liquor is supplied prior to the operation. Aerobic cultivation was carried out in the second tank. That is, 20 l. in volume of the medium was placed into 40 l. in volume of the tank, in which no hydrocarbon was added and an aqueous solution of the same composition as above except for the hydrocarbon was continuously fed. Table 1 shows the results of determination of the time of emulsion of formation (residence time) in the first tank and the efficiency of cell formation in the second tank, in the case where the fermentation waste liquor is added at a ratio from 5 to 75% by volume on total medium. There are observed reduction in time required for emulsifying the hydrocarbon by the addition of the fermentation waste liquor in the first tank and rise in ratio of the formation.

TABLE 1.—EFFECTS OF THE FERMENTATION WASTE LIQUOR UPON THE EMULSIFICATION AND MYCELIAL FORMATION.

| Concentration of the fermentation waste liquor, percent (by volume) | Time of emulsification (1st tank), hr. | Dried mycelia (g.)/ hydrocarbon added (g.), percent |
|---|---|---|
| 5 | 5 | 92 |
| 10 | 5 | 95 |
| 25 | 4 | 99 |
| 50 | 3.5 | 103 |
| 75 | 3 | 103 |
| 0 | 7 | 91 |

Fermentation conditions in the first tank: 30° C., 500 r.p.m., aeration 60%, liquor volume 4 l., adjusted to pH 4.5–5.0 by aqueous ammonia. Fermentation condition in the second tank: 30° C., 400 r.p.m., aeration 100%, residence time 4 hrs.

EXPERIMENT 2

The same strain and medium were used as in Experiment 1 except for the fermentation waste liquor which was added in the first tank at a concentration of 25% by volume on total medium and examined for the effect of addition of the alcohol in the first tank. Table 2 shows the results.

TABLE 2.—EFFECTS OF THE ALCOHOL ADDITION (PERCENT)

| Concentration of alcohol by volume | 0.05% | 0.1% |
|---|---|---|
| Alcohol: | | |
| Methanol | 106 | 101 |
| Ethanol | 108 | 118 |
| Propanol | 111 | 118 |
| Isopropanol | 112 | 119 |
| Butanol | 110 | 117 |
| Pentanol | 109 | 116 |
| Hexanol | 106 | 106 |
| Heptanol | 110 | 108 |
| Capryl alcohol | 111 | 113 |
| Nonyl alcohol | 113 | 111 |
| Decyl alcohol | 117 | 110 |
| Lauryl alcohol | 108 | 111 |
| Myristyl alcohol | 105 | 112 |
| Cetyl alcohol | 110 | 112 |
| Octadecanol | 108 | 117 |
| Control | 99 | |

The figures in the table indicate; dried cells in gram/ added hydrocarbon in gram × 100.

As clearly seen from Table 2, simultaneous addition of the fermentation waste liquor and alcohol produces remarkable synergistic effects.

The effect of the alcohol addition may be ascribed to improved efficiency of assimilation of the hydrocarbon into the cells but not to assimilation of the alcohol as the carbon source into the cells. This may be understood from the fact that higher yields of the cells are obtained as compared with the highest possible assimilation of the alcohol into the cells. The addition of alcohols is preferably in a range from about 0.03% to about 0.5% by volume of the total medium.

As described above, combination of the use of a strain capable of efficiently consuming hydrocarbons, the use of two fermentation tanks, an emulsification tank and a main fermentation tank and addition in the emulsification tank of the fermentation waste liquor previously used and a small amount of an alcohol is most suitable for formation of the yeast cells or the fermentation products with stability, at a high efficiency in terms of the hydrocarbon and in a short period of time and isolation thereof. The two-tank fermentation of this invention is entirely different in principle from the prior two-tank fermentation comprising an aging tank arranged in row.

The following specific examples further illustrate the invention.

EXAMPLE 1

Continuous fermentation of a yeast was carried out in two fermentation tanks containing media of the following compositions. The yeast used was *Candida petrophilum* ATCC No. 20226.

Medium in the first tank:
Straight chain paraffins containing from 14 to 17 carbon atoms (purity 98% or higher): 20 ml.
Ammonium sulfate: 0.3 g.
Urea: 0.3 g.
Monobasic potassium phosphate: 0.1 g.
Dibasic potassium phosphate: 0.1 g.
Ethanol: 0.05 g.
Magnesium sulfate: 0.01 g.
Ferrous sulfate: 0.005 g.
Corn steep liquor: 0.2 g.
Tap water: 100 ml.
pH: 5.5

Medium in the second tank:
Ammonium sulfate: 0.3 g.
Monobasic potassium phosphate: 0.1 g.
Dibasic potassium phosphate: 0.1 g.
Sodium chloride: 0.1 g.
Magnesium sulfate: 0.01 g.
Ferrous sulfate: 0.005 g.
Vitamin $B_1$: 100γ
Tap water: 100 ml.
pH: 4.5

The medium in the first tank contains 20% by volume of the hydrocarbon and the medium in the second tank contains no hydrocarbon. The fermentation liquor was transferred from the first tank to the second tank for effecting the continuous cultivation with the residence times under the conditions set forth below. In the first and second tanks respectively in capacities of 8 l. and 40 l. were placed 4 l. and 20 l. of the medium respectively. The cells in the second tank after completion of the fermentation were removed centrifugal separation and the lighter liquor was passed to the first tank to prepare a mixture of the lighter liquor and the fresh medium at a ratio of 4:6 by volume for the fermentation therein. The residence time in the first tank was 3 hours and the fermentation in the second tank was completed in 4 hours. The fermentation conditions in the first tank were 30° C., pH 5.0–6.0 adjusted with aqueous ammonia, 400 r.p.m. and 60% of aeration. The second tank was controlled under such conditions as 33° C., pH 4.5–5.0, 400 r.p.m. and 100% of aeration. The fermentation liquor thus produced was subjected to centrifugal separation by means of a Westfalia separator into lighter and heavier liquors. To the heavier liquor was added a sorbitan aliphatic acid ester at a ratio of 0.005 g. per 100 ml. of the fermentation liquor and the mixture was heated to 50° C. followed by centrifugal separation. The cells thus separated were washed with water and dried over a drum drier. The yield was 109 g. of the yeast cells on a dried basis per 100 g. of the hydrocarbon added. Yield of the isolation of the cells was 92%, which enabled use as they were in the animal feed as a protein source.

EXAMPLE 2

*Torulopsis petrophilum* ATCC No. 20225 was cultivated by the process entirely identical with that in Example 1. The alcohol used was propanol. Propanol was continuously added to the first tank at a concentration of about 0.05% by volume. Continuous fermentation was conducted using as the second tank a Waldhof type tank of the same capacity as in Example 1. Employing the conditions of fermentation and treatment after separation of the cells entirely identical with those in Example 1 resulted in the dried mycelia in a yield of 104 g. per 100 g. of the hydrocarbon added. Efficacy of the cells separation by the use of a Westfalia separator was 92%. The cells thus obtained can be utilized as they are as a protein source in the animal feed.

EXAMPLE 3

Continuous fermentation of yeast was conducted in two fermentation tanks containing media of the following compositions, using *Candida petrophilum* ATCC No. 20226.

Medium in the first tank:
  Normal hexadecane: 20 ml.
  Ammonium sulfate: 0.3 g.
  Urea: 0.3 g.
  Monobasic potassium phosphate: 0.1 g.
  Dibasic potassium phosphate: 0.1 g.
  Propanol: 0.05 ml.
  Magnesium phosphate: 0.01 g.
  Ferrous phosphate: 0.005 g.
  Corn steep liquor: 0.2 g.
  Tap water: 100 ml.
  pH: 5.5
Medium in the second tank:
  Ammonium sulfate: 0.3 g.
  Monobasic potassium sulfate: 0.1 g.
  Dibasic potassium phosphate: 0.1 g.
  Magnesium sulfate: 0.01 g.
  Ferrous sulfate: 0.005 g.
  Waste molasses: 0.3 g.
  Trimethyl octadecyl ammonium chloride: 0.05 g.
  Tap water: 100 ml.
  pH: 5.5

A similar medium to that used in Example 1 was inoculated with the yeast and placed in the same vessel. The cells after completion of the fermentation in the second tank were removed by centrifugal separation and the lighter liquor was passed to the first tank, in which fermentation was carried out in a mixture of the lighter liquor and the fresh medium at a ratio of 4:6. The residence time in the first tank was 3 hours and the fermentation in the second tank was completed in 5 hours. Continuous fermentation was effected under such conditions in the first tank as 30° C., pH 5.0–6.0, 500 r.p.m. and 100% of aeration and under such conditions in the second tank as 30° C., pH 5.0–6.0, 400 r.p.m. and 100% of aeration. From the fermentation liquor thus obtained were removed cells by centrifugal separation and the fermentation broth was made acidic with sulfuric acid. Ether was then added to the acidified fermentation broth at a ratio of 300 ml. of the former per 1 l. of the latter. The extraction was repeated twice and the ether was removed from the extract under reduced pressure. The residue was allowed to stand in a cold place to obtain 14 g. of crystalline citric acid from 1 l. of the fermentation.

EXAMPLE 4

Cultivation of *Brettanomyces petrophilum* ATCC No. 20224 was carried out under the conditions entirely identical with those in Example 1 except that straight chain paraffins containing from 11 to 15 carbon atoms (purity 98% or higher) were used. The yeast cells were obtained in a yield of 102 g. on a dried basis per 100 g. of the added hydrocarbon.

What is claimed is:

1. Method of cultivating hydrocarbon-consuming yeasts by a continuous fermentation process which comprises cultivating *Torulopsis petrophilum*, *Candida petrophilum* or *Brettanomyces petrophilum*, a species of yeast capable of consuming hydrocarbons as the carbon source in a medium containing a hydrocarbon fraction boiling at temperatures in a range from 200 to 360° C.; aerobically conducting said cultivation in an apparatus consisting of (1) an emulsification tank to form an emulsion of said hydrocarbon and an aqueous solution and (2) a main fermentation tank for effecting cells formation or fermentative production of useful substances, said tanks being connecteed in series; using as the medium in said emulsion tank a medium containing said hydrocarbon at a concentration of from about 5 to about 40% by volume, from about 5 to about 75% by volume of the fermentation waste liquor from the main fermentation tank and an alcohol selected from the group consisting of methyl, ethyl, propyl, isopropyl, butyl, pentyl, hexyl, heptyl, capryl, nonyl, decyl, lauryl, myristyl, cetyl and octadecyl alcohols at a concentration of from 0.03 to 0.5 percent by volume based on the entire volume of said medium; and feeding into said main fermentation tank the emulsified fermentation liquor obtained in said emulsification tank.

2. Method according to claim 1 wherein said hydrocarbon is a straight chain hydrocarbon.

3. Method according to claim 1, wherein the cultivation temperature is from 25 to 37° C.

4. Method according to claim 1, wherein the alcohol is ethyl alcohol or propyl alcohol.

References Cited

UNITED STATES PATENTS

| | | | |
|---|---|---|---|
| 2,697,061 | 12/1954 | Harris et al. | 195—3 HX |
| 3,212,994 | 10/1965 | Kono et al. | 195—114 X |
| 3,271,266 | 9/1966 | Laine et al. | 195—28 RX |
| 3,293,145 | 12/1966 | Leavitt et al. | 195—114 X |
| 3,326,771 | 6/1967 | Leavitt | 195—28 RX |
| 3,355,296 | 11/1967 | Perkins et al. | 195—28 RX |
| 3,411,989 | 11/1968 | Nakao et al. | 195—82 X |
| 3,474,001 | 10/1969 | Leavitt | 195—28 R |
| 3,510,403 | 5/1970 | Laine et al. | 195—3 H |

JOSEPH M. GOLIAN, Primary Examiner

U.S. Cl. X.R.

195—82, 114, 115